(12) United States Patent
Klann et al.

(10) Patent No.: US 6,479,826 B1
(45) Date of Patent: Nov. 12, 2002

(54) COATED SEMICONDUCTOR DEVICES FOR NEUTRON DETECTION

(75) Inventors: Raymond T. Klann, Bolingbrook, IL (US); Douglas S. McGregor, Whitmore Lake, MI (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 37 days.

(21) Appl. No.: 09/717,033

(22) Filed: Nov. 22, 2000

(51) Int. Cl.[7] ................................................. G01T 3/08
(52) U.S. Cl. .......................... 250/370.05; 250/370.04; 250/472.1; 250/390.01
(58) Field of Search ..................... 250/472.1, 370.04, 250/370.05, 390.01

(56) References Cited

U.S. PATENT DOCUMENTS 4,419,578 A * 12/1983 Kress .................... 250/370.05
5,969,359 A * 10/1999 Ruddy et al. .......... 250/370.05

OTHER PUBLICATIONS

"Semi–Insulating Bulk GaAs as a Semiconductor Thermal–Neutron Imaging Device", D.S. McGregor et.al., Nuclear Instruments and Methods in Physics Research, 1996, 271–275.

* cited by examiner

Primary Examiner—Constantine Hannaher
Assistant Examiner—Andrew Israel
(74) Attorney, Agent, or Firm—Bradley W. Smith; Mark P. Dvorscak; Paul A. Gottlieb

(57) ABSTRACT

A device for detecting neutrons includes a semi-insulated bulk semiconductor substrate having opposed polished surfaces. A blocking Schottky contact comprised of a series of metals such as Ti, Pt, Au, Ge, Pd, and Ni is formed on a first polished surface of the semiconductor substrate, while a low resistivity ("ohmic") contact comprised of metals such as Au, Ge, and Ni is formed on a second, opposed polished surface of the substrate. In one embodiment, n-type low resistivity pinout contacts comprised of an Au/Ge based eutectic alloy or multi-layered Pd/Ge/Ti/Au are also formed on the opposed polished surfaces and in contact with the Schottky and ohmic contacts. Disposed on the Schottky contact is a neutron reactive film, or coating, for detecting neutrons. The coating is comprised of a hydrogen rich polymer, such as a polyolefin or paraffin; lithium or lithium fluoride; or a heavy metal fissionable material. By varying the coating thickness and electrical settings, neutrons at specific energies can be detected. The coated neutron detector is capable of performing real-time neutron radiography in high gamma fields, digital fast neutron radiography, fissile material identification, and basic neutron detection particularly in high radiation fields.

6 Claims, 5 Drawing Sheets

FIG. 4
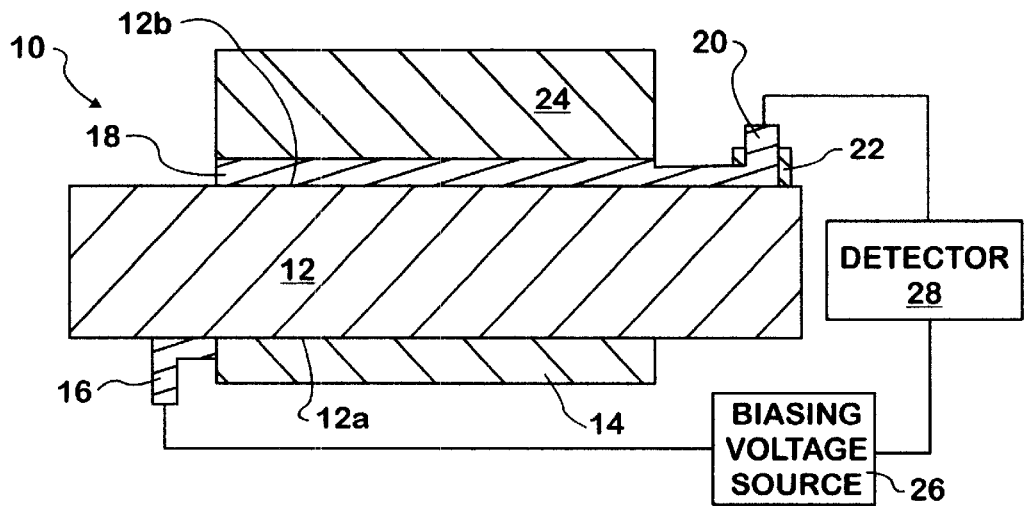
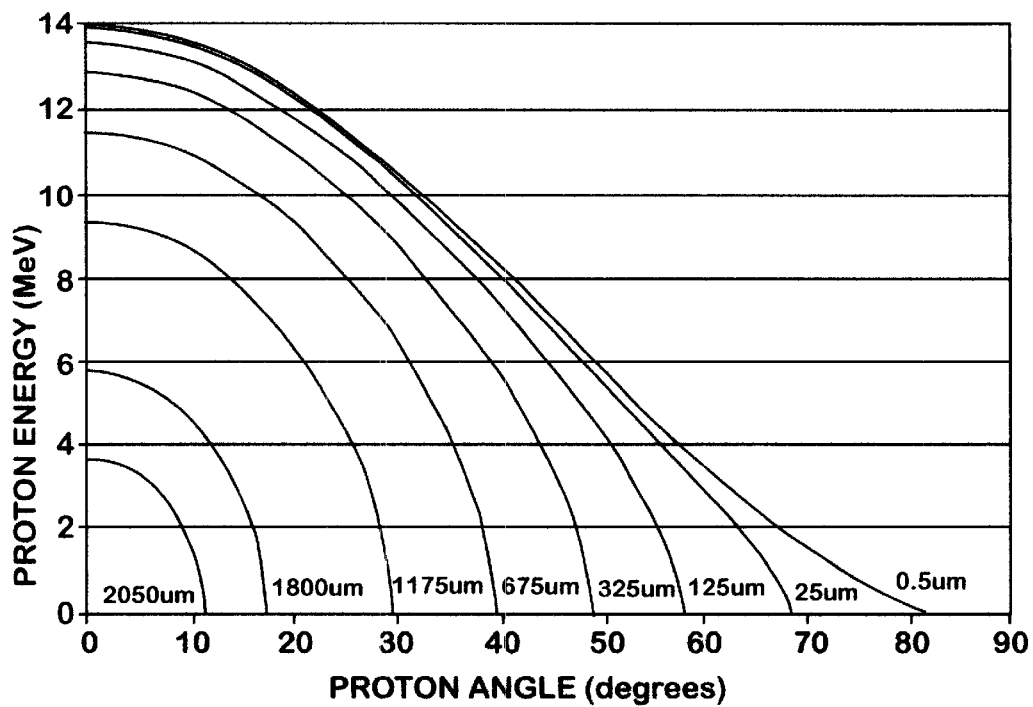
FIG. 2

FIG. 5
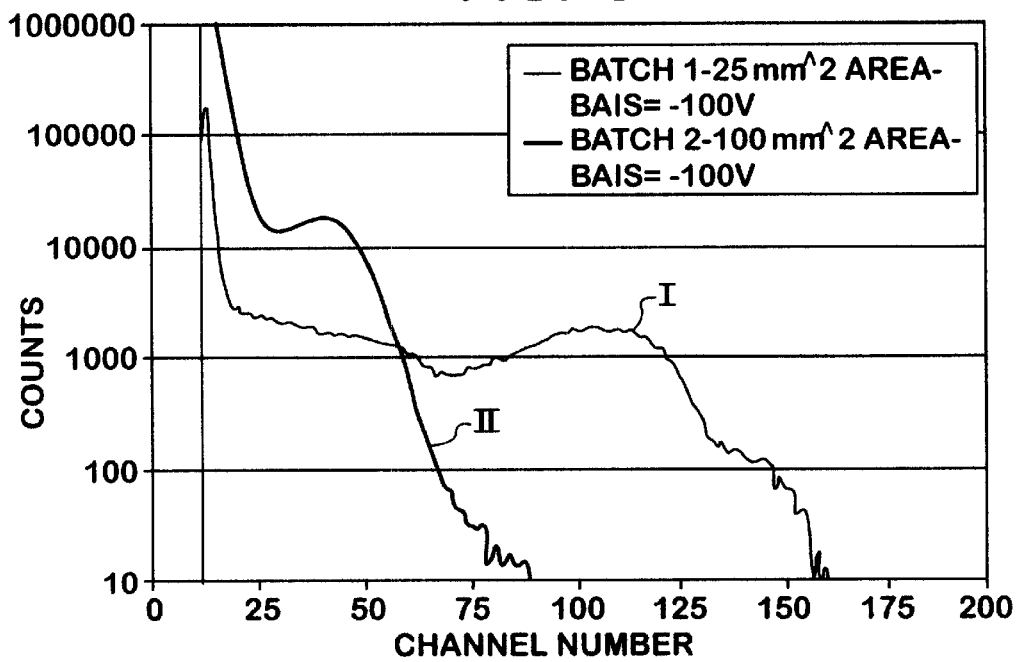
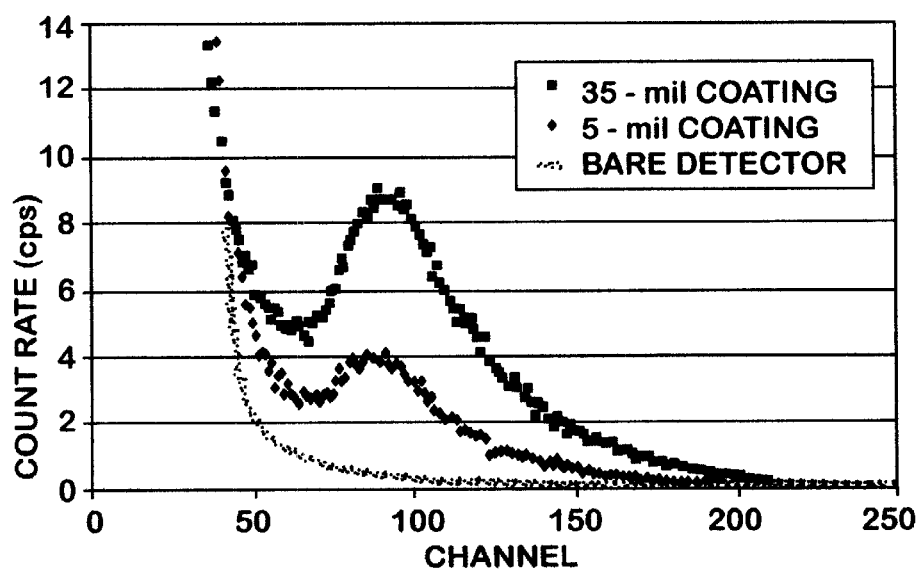
FIG. 6

US 6,479,826 B1

COATED SEMICONDUCTOR DEVICES FOR NEUTRON DETECTION

CONTRACTUAL ORIGIN OF THE INVENTION

The United States Government has rights in this invention pursuant to Contract No. DE-AC02-98CH10913 between the U.S. Department of Energy (DOE) and the University of Chicago representing Argonne National Laboratory.

BACKGROUND OF THE INVENTION

Semiconductor particle detectors coated with neutron reactive films have shown promise as potential neutron detectors. The device operation is simple and involves a semiconductor diode detector coated with a neutron reactive film that spontaneously emits ionizing radiation upon the interaction with a neutron. The ionizing radiation, preferably in the form of charged particles, can enter the diode detectors and be detected.

Generally, the methods used to recognize neutron interactions within a detector rely on second-order effects. Two very common neutron interactions that are used for a variety of thermal neutron detectors, i.e., neutrons; having energies less than approximately 0.5 eV, are the $^{10}B(n,\alpha)^7Li$ reaction and the $^6Li(n,\alpha)^3H$ reaction. The charged-particle reaction products emitted as a result of neutron interactions in B-10 and Li-6 can be easily detected with a charged-particle detector. At higher neutron energies, fission chambers, ionization chambers, devices using He-3, and other arrangements are commonly used. The sensitivity of the detection devices at these higher neutron energies is limited because of the reduced cross section for interactions.

Low atomic number materials such as hydrogen tend to have relatively high elastic scattering cross sections for fast neutrons, and often (n,p) reactions from fast neutrons, i.e., neutrons having energies greater than approximately 500 KeV, interacting in hydrogen-filled materials are manipulated for fast neutron detection.

Semi-insulating (Si) bulk GaAs has been studied as a radiation detector for a variety of applications, but has suffered difficulties due to electric field perturbations in Schottky-based diodes fabricated from the material. Reverse-biased Schottky barrier diodes fabricated from undoped Si GaAs that has been compensated with the deep level EL2 demonstrate an unusually truncated electric field distribution. The electric field in reverse biased Si GaAs diodes is clearly divided into a high electric field region (approximately $10^4$ V/cm) and a low electric field region (negligible voltage). The present invention is based on the heretofore unrecognized fact that only a small region near the rectifying contact is actually active under low reverse bias, and secondly, the active region increases in width linearly with applied voltage. The active region width increases on the average as 1 V/m, although the dependence has been observed to range between 0.5–2.0 V/m. Termed the "truncated electric field effect", the present invention takes advantage of this physical phenomenon.

The present invention addresses the limitations of the prior art in detecting high energy neutrons by providing a GaAs device coated with a hydrogen-rich material such as a polymer having a large cross section for epithermal neutrons.

OBJECTS AND SUMMARY OF THE INVENTION

Accordingly, it is an object of the present invention to provide a device for detecting high energy neutrons, i.e., greater than approximately 500 KeV, even in high radiation fields.

It is another object of the present invention to provide a highly sensitive neutron detector capable of discriminating from other forms of radiation for improved detection accuracy.

Yet another object of the present invention is to provide a neutron detector for use in real-time neutron radiography in high gamma fields, digital fast neutron radiography, and fissile material identification.

A further object of the present invention is to provide a coated semiconductor neutron detector which affords improved detection efficiency at specific neutron energies, spatial resolution of the detected neutrons, neutron energy discrimination, radiation hardness and ease of operation.

This invention contemplates apparatus for detecting neutrons comprising: a semiconductor substrate having first and second opposed surfaces; a layered metal arrangement disposed on the first surface of the semiconductor substrate and forming a rectifying junction; a low resistivity contact layer disposed on the second opposed surface of the semiconductor substrate; a voltage source connected between the layered metal arrangement and the low resistivity contact layer for reverse-biasing rectifying junction; and a thin neutron responsive layer disposed on the low resistivity contact layer and responsive to energetic neutrons incident thereon for providing positive charged particles to the semiconductor substrate.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 2 is a graphic representation of the energy of a proton entering the active region of a GaAs Schottky barrier detector as a function of the scattering angle of the proton, where the proton energy is shown for a range of interaction depths within a polyethylene coating on the GaAs Schottky barrier detector;

FIG. 4 is a simplified sectional view of a GaAs Schottky barrier detector having a polyethylene coating thereon for detecting high energy neutrons in accordance with the principles of the present invention;

FIG. 5 is a graphic representation of the performance of prior boron coated GaAs Schottky barrier detectors in detecting thermal neutrons, with the detectors reverse biased by voltages of 100V (Curve I) and 160V (Curve II);

FIG. 6 is a graphic illustration of the performance of GaAs barrier detectors with two different high density polyethylene coating thicknesses thereon for detecting high energy neutrons in accordance with the present invention.

DETAILED DESCRIPTION OF THE PREFERRED EMBODIMENTS

Figure 1:
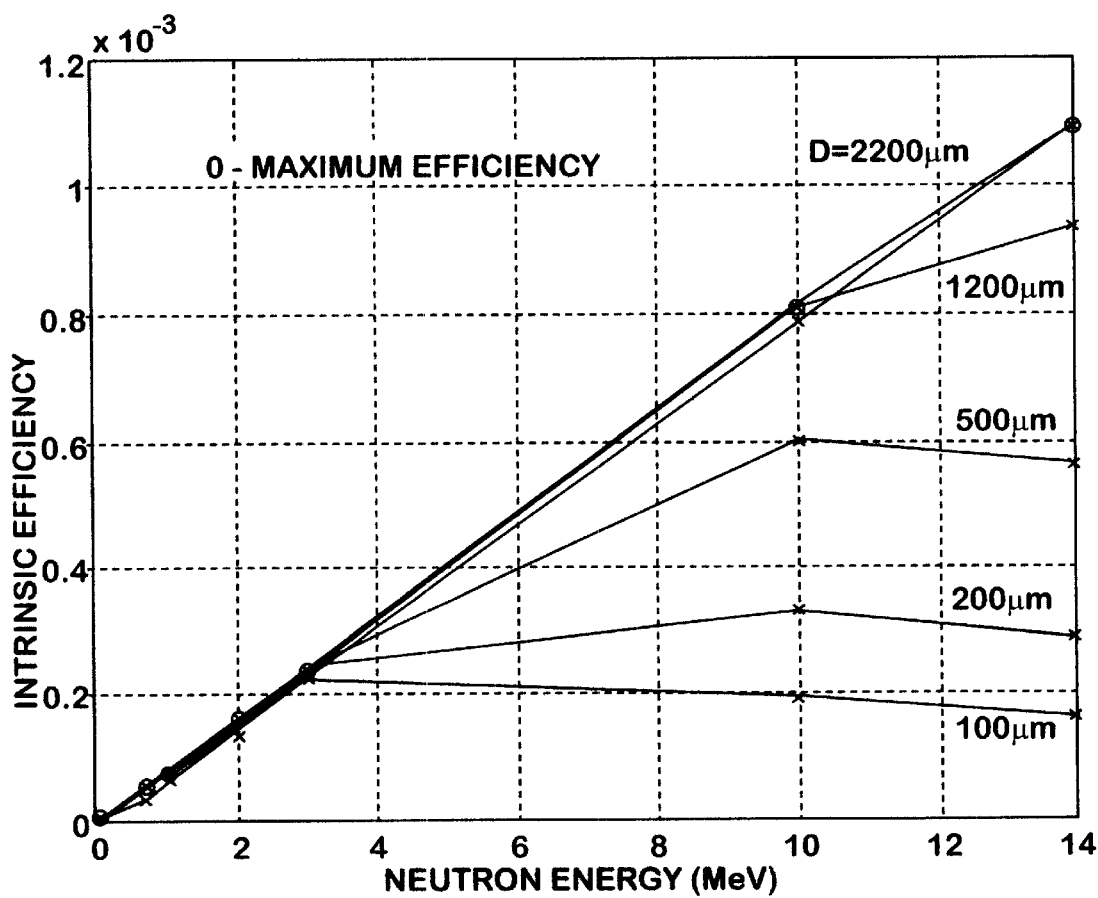
FIG. 1 is a graphic representation of the calculated efficiency of polyethylene coated GaAs Schottky barrier neutron detectors in accordance with the present invention as a function of the incident neutron energy for a range of coating thicknesses.

The present invention contemplates the use of a semiconductor material coated with selected materials for use in detecting neutrons. The coatings serve to convert the incident neutrons into charged particles, which are detected by charge production in the active region of a semiconductor wafer. Diodes on the surface of the wafer are used to collect the induced charge.

The detectors are rugged and offer many advantages over existing detectors including positional information, directional dependence, gamma discrimination, radiation hardness, and spectral tailoring, i.e., designed for detection of neutrons at specific energies. In addition, the detectors provide much better spatial resolution than He-3, fission chambers, and other existing detectors, and much faster timing than existing position sensitive recording devices—such as track-etch and activation foil methods. Some of the applications of these detectors in the nuclear industry include neutron radiography, neutron detection in high radiation fields, and radioactive material examination and characterization.

The truncated field effect in bulk semiconductor materials compensated with the intrinsic deep level defect EL2 discussed above is fortuitous for many reasons when applied to charged particle and neutron detection. First, the required operating voltage is reduced since the active region need be only as wide as the maximum range of the charged particles being measured. Generally, the required active region width is only a few tens of micrometers. Second, the low electric field region is inactive, hence background gamma ray noise interactions in the active region are significantly reduced. In other words, the devices can self-discriminate between gamma rays and more energetic charged particles and ions. Third, the substrate thickness determines the device capacitance, not the active region thickness. Hence, the actual device electronic noise can be kept low while minimizing the active region thickness.

The basic device structure is a Schottky barrier diode, in which a cleaned and etched semiconductor surface has been overlaid with a vacuum evaporated metal. In the present case, the metals consist of a layered structure of Ti, Pt and Au. GaAs is a III-V compound semiconductor, in which many energy states appear in the band gap at the surface. These very same surface states establish the formation and barrier height of the Schottky barrier formed at the metal/semiconductor interface. The Schottky barrier provides a rectifying junction, in which the device formed is generally referred to as a Schottky diode. Hence, the simple formation of a metal onto a cleaned and etched semiconductor surface will produce a rectifying diode that can be used for charged particle detection. Furthermore, the metal contact and barrier can be made very thin (on the order of only a few hundred angstroms), thereby attenuating only a small fraction of energy from charged particles entering the detector. It is important to note that the surface state density establishes the Schottky barrier height, and therefore also establishes the leakage current and maximum reverse bias voltage. Hence, significant alterations in the surface state density ($>10^{16}/cm^3$) must occur before the device begins to degrade. The effect provides a natural form of radiation hardening, in which very little device degradation is observed over a wide range of gamma ray, charged particle, and neutron fluences. For example, B-10 coated GaAs detectors have been irradiated with $10^{13}$ thermal neutrons/$cm^2$ without any noticeable change in the device operating characteristics. While various semiconductor materials may be used as the substrate in the inventive neutron detector, the present invention will be described in the following paragraphs as employing a GaAs substrate because measurements of a neutron detector incorporating a GaAs substrate are described below.

Figure 1A:
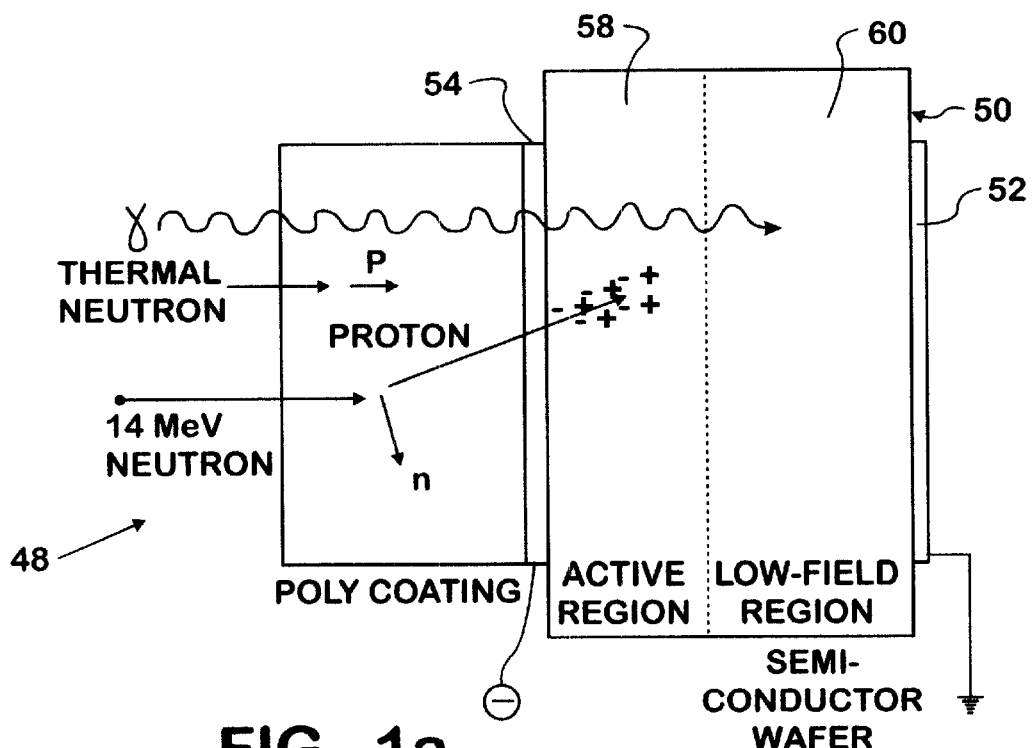
FIG. 1a is a simplified schematic diagram of an arrangement incorporating a coated semiconductor device in accordance with the present invention for detecting high energy neutrons.

Referring to FIG. 1a, there is shown a simplified schematic diagram of a neutron detector 48 in accordance with the principles of the present invention. Neutron detector 48 includes a semiconductor wafer 50 having first and second opposed surfaces. Deposited on a first surface of the semiconductor wafer 50 is a first stacked metal layer 52. Deposited on a second, opposed surface of the semiconductor wafer 50 is a second stacked metal layer 54. Deposited on the second stacked metal layer 54 is a neutron responsive coating 56. When a voltage is applied across the semiconductor wafer 50, a truncated high field or active region 58 is produced near the second stacked metal layer 54. Energetic neutrons incident on the neutron responsive coating 56 are converting into charged; particles i.e, recoil protons, which are then detected by charge production in the active region 58 of the semiconductor wafer 50. The first and second stacked metal layers 52, 54 form diodes on the opposed surfaces of the semiconductor wafer 50 with a biasing voltage applied across the wafer. Charge production that occurs in a low field or substrate region 60 in the semiconductor wafer 50 is not collected. Because the active region 58 is so thin, typically 10–20 $\mu$m, the charge induced from other forms of radiation, such as gamma rays, is much lower and can be easily discriminated. Protons (P) formed in the neutron responsive coating 56 by thermal neutrons incident thereon with energies less than approximately 100 keV do not reach the second stacked metal layer 54 of the detector and are also easily discriminated. Gamma ray events occurring in the low field region 60 do not contribute to induced charge and are also not observed.

The basic GaAs device structure 10 consists of a semi-insulating bulk GaAs substrate 12, as shown in the sectional view of FIG. 4, which has been polished on both sides. The blocking Schottky contact consists of a series of metals—Ti, Pt and Au. A low resistivity contact (sometimes referred to as an "ohmic contact") is fabricated on the opposite side. Generally, n-type low resistivity contacts are used, consisting of a Au/Ge based eutectic alloy or a multiple level Pd/Ge/Ti/Au contact. A neutron reactive film is either evaporated or attached to the Schottky contact as described in detail below. The device is reversed biased and charged particles emanating from the neutron reactive film that enter the GaAs Schottky diode excite electron-hole pairs. The electrons and holes are separated by the applied electric field in the active region, thereby producing a measurable pulse in the external output device circuitry.

The coating placed on the Schottky diode of the GaAs substrate determines the response of the device to neutrons. Prior boron coated detectors are sensitive to the $^7$Li and $\alpha$-particle reaction products from the $^{10}$B(n,$\alpha$)$^7$Li reaction. High density polyethylene (HDP) coated detectors in accordance with the present invention are sensitive to recoil protons from elastic scattering from the hydrogen. Based on the material selected, the energy response of the detector will vary according to the cross-section of the interaction of interest. This could be boron-10 which has a high alpha production cross-section for thermal neutrons but a much lower cross-section for epithermal or fast neutrons. Alternatively, hydrogen can be used to produce protons from elastic scattering. The scattering cross-section for hydrogen is larger than the (n,a) cross-section of boron-10 above about 1 keV, but it is much lower for energies below 1 keV.

Because the cross-sections of the numerous potential coating materials vary greatly as a function of the neutron energy from a 1/v response, to a flat response, to a response that has well defined resonances, the intended application of the detector is crucial in the selection of a coating. But this is not the only consideration. The charged particle (or particles) and its energy also affect the efficiency of the detector. If the only factor is the interaction probability of the neutron, then regardless of what coating is used, the coating thickness could be increased until the desired efficiency of interaction is obtained. However, there is a practical limit based on the range of the charged particle in the coating. Once the coating thickness equals the maximum range of the charged particle, the efficiency of the detector is maximized. Beyond this point, efficiency slowly decreases because neutrons are being absorbed without any energy deposited in the detector. Thus, the maximum range of the charged particle coupled with neutron cross-section establishes an absolute limit on the intrinsic efficiency of the detector.

These factors were considered in determining the most efficient detectors in accordance with the present invention for each energy range. For fast neutrons (neutrons above 500 keV) the best choice is a hydrogen-rich coating such as polyethylene. This allows energetic protons to be produced directly from scattering. The proton energy is dependent on energy which is discussed in more detail below. At thermal energies, i.e., less than approximately 0.5 eV, boron-10 is a good choice because it produces alpha particles and lithium ions with energies well above low-level discriminator settings. This allows good discrimination against the gamma background. Another good choice for thermal neutron detection are Li compounds because $^6$Li produces α-particles. Fissionable materials, such as U-235 and Pu-239, can be useful in the energy range from a few eV up to about 1 KeV. For example, Pu-239 can offer an improvement of a factor of 10 in efficiency over boron-10 at 0.3 eV.

A computer code was Written to look at the behavior of the coating and proton energy loss in the coating thickness and in the active region of the detector. Data for the energy loss in polyethylene and gallium was taken from International Committee on Radiation Units and Measurements (ICRU) Report No. 49D entitled "Stopping Powers and Ranges for Protons and Alpha Particles." The first item that was readily apparent is that the cross-section for scattering is so low that the addition of thin layers of polyethylene on the detector did not significantly degrade the beam. The intrinsic efficiency was calculated as a function of neutron energy for different coating thicknesses. The results are shown in FIG. 1, along with an estimate of the maximum efficiency. It is observed that it is not possible to improve the efficiency at any energy (up to 14 MeV) by making the coating thicker than 2200 μm. This is reasonable since it corresponds to the maximum range of a 14 MeV proton in polyethylene. The protons cannot reach the active region of the detector from interactions in the coating that occur more than 2200 μm away. The other immediately observable phenomenon is that the spectral response of the detector can be tailored by varying the coating thickness. For any given neutron energy, the detector efficiency is maximized for a coating thickness that matches the maximum range of a proton with the same energy. This would occur for a scattering event in which the proton was ejected at a zero degree angle, or directly forward.

Directional dependence of high density polyethylene coated detectors is readily apparent from the kinematics of elastic scattering from hydrogen. No recoil protons can be scattered in the backward direction. In addition, the proton energy is a strong function of the angle of scattering—from full energy in the forward direction to zero energy 90 degrees from the incident neutron. FIG. 2 shows the energy of a proton entering the GaAs wafer (from a 14 MeV neutron) as a function of the scattering angle for interactions at different depths in the coating. If the detector is placed in a neutron beam so that the coating is behind the GaAs wafer, i.e., on its rear side, no detector response is expected.

Figure 3:
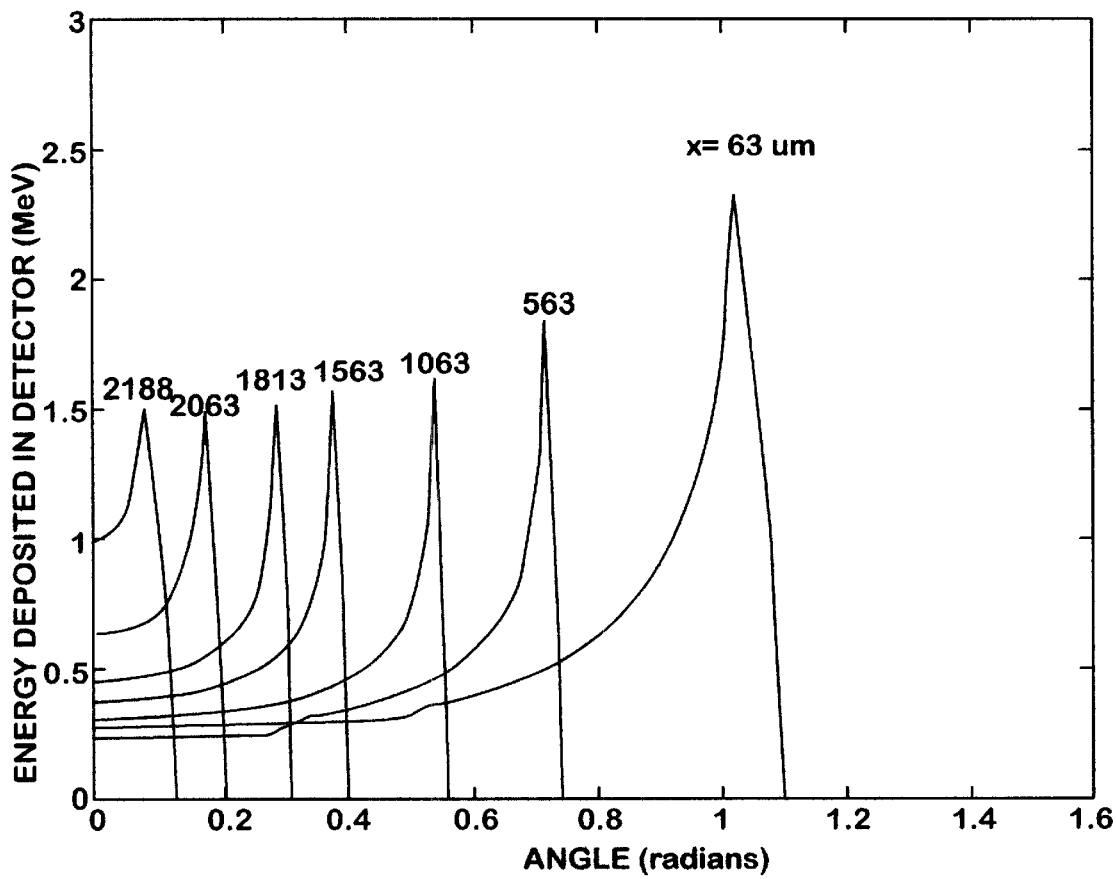
FIG. 3 is a graphic representation of the energy deposited in the active region of a GaAs Schottky barrier detector having a polyethylene coating in accordance with the present invention as a function of the incident proton angle, where the energy deposition is shown for a range of interaction depths within the coating.

FIG. 3 shows the amount of energy deposited in the high field region of the detector (assuming a high field region of 10 μm and 14 MeV neutrons) as a function of the scattering angle for interactions at different depths in the coating. The same depths are shown in FIG. 3 as are shown in FIG. 2. The energy deposition is shown for different interaction depths within the polyethylene coating, where 0.5 μm is closest to the active region. The active region of the detector is 10 μm. As the interaction depth increases, the solid angle of the emitted protons becomes smaller. This means that as additional coating is added, there is less benefit from doing so, i.e., the effect is not linear. In addition, directional dependence is exhibited as a function of thickness. The limiting angle of the proton is evidenced by the sharp drop off in energy deposited in the detector. The peak corresponds to the angle at which the full energy of the proton is deposited in the active region of the detector. It is also evident that as the incident neutron angle deviates from normal, the proton solid angle decreases and there is a smaller detector response. For example, for 14 MeV neutrons causing an interaction at a depth of 563 μm, the detector response will be reduced to half if the incident angle is approximately 75 degrees and will be reduced to zero as the incident angle approaches 90 degrees.

Referring to FIG. 4, there is shown a simplified sectional view of a GaAs diode in accordance with the principles of the present invention. The inventive GaAs diode was manufactured in the following manner. A commercial bulk semi-insulating (Si) GaAs wafer 12 was used for the device. The back surface 12a of the wafer was lapped at 30 rpm with a 3 μm calcined aluminum oxide; powder/de-ionized water solution over an optically flat glass plate until 100 microns of GaAs material was removed. The wafer's back surface 12a was then polished with a 0.3 μm calcined aluminum oxide powder mixed in a sodium hypochlorite solution over a chemically resistant polishing cloth at 65 rpm for 10 minutes. A final polishing was performed with a 50:50:1 methyl alcohol:glycerol:bromine solution for 10 minutes over a chemically resistant polishing pad at 70 rpm. The wafer was then cleaned in a series of solvents and etched in a 1:1:320 $H_2SO_4$:$H_2O_2$:de-ionized water solution for 5 minutes followed by a 2 minute etch in a 1:1 HCl: de-ionized water solution. The wafer was then cleaned in a de-ionized water cascade and blown dry with $N_2$.

The wafer's back surface 12a was then implanted at an angle of 7 degrees from normal with $^{29}$Si ions at an average energy of 100 KeV at a dose amounting to 5×10$^{13}$ ions per cm$^2$. The implants were activated with a rapid thermal anneal in Ar for 30 seconds at 800° C. Afterwards, a stacked layer 14 of Ge (500 Å): Pd (1300 Å) was vacuum evaporated over the back surface 12a, followed by a low temperature anneal at 250C in $N_2$ for 30 minutes. Vacuum evaporation of a stacked layer of Ti (150 Å): Au (700 Å) forming a first pinout 16 completed back surface processing of the device.

Processing of the device's front surface 12b included lapping and polishing of the sample, in which the initial lapping with 3 μm calcined aluminum oxide powder was used to thin the GaAs wafer 12 to 250 μm total thickness. The GaAs wafer 12 was then polished using 0.3 μm calcined aluminum oxide powder mixed in a sodium hypochlorite solution followed by a methyl alcohol:glycerol:bromine solution. Again, the GaAs wafer 12 was cleaned in a series of solvents and etched in a 1:1:320 $H_2SO_4$:$H_2O_2$:de-ionized water solution for 5 minutes followed by a 2 minute etch in a 1:1 HCl:de-ionized water solution. Afterwards, the GaAs wafer 12 was cleaned in a de-ionized water cascade and blown dry with $N_2$.

Four basic pad area designs were employed for first batch sets of the inventive GaAs diode 10, including 5 mm×5 mm squares, 10 mm×10 mm squares, 5.64 mm diameter circles, and 11.12 mm diameter circles. The designs were patterned onto the surfaces with photoresist. A final etch in the circular patterns was performed with the $H_2SO_4$: $H_2O_2$:de-ionized water solution followed by the HCl:de-ionized water solution. The wafers were then washed in a de-ionized water cascade and blown dry with $N_2$. A stacked layer of Ti:Au forming a second pinout 20 was evaporated over the wafer and lifted off in acetone. Other variations used a system of Ti:Pt:Au contacts.

Polyethylene-coated GaAs diodes 10 in accordance with one embodiment of the present invention were manufactured by adhering various thicknesses of high density polyethylene coating 24 to the bare Schottky contacts. A stacked electrical outlet layer 18 was first deposited on the front side 12b of the GaAs wafer 12. The electrical contact layer 18 was comprised of Au, Ge and Ni, but may also be comprised of Pt and Pd. A high density polyethylene coating 24 with thicknesses including "Humiseal" only of 50 μm (0.002 inch), 125 μm (0.005 inch), 250 μm (0.010 inch), 450 μm (0.018 inch), 900 μm (0.035 inch), and 2030 μm (0.080 inch) was then deposited on the electrical contact layer 18. The individual devices were cleaved from the GaAs wafer 12, and fastened with silver-based epoxy to 1 mm thick aluminum oxide mounts. A second pinout 20 comprised of Ti and Au was formed on a portion of the stacked electrical contact layer 18. An electrical isolator 22 was then formed on the second pinout 20. A biasing DC voltage source 26 is connected between the first and second pinouts 16, 20 for reverse biasing the Schottky barrier GaAs diode 10. A detector 28 is connected in circuit with the GaAs diode 10 for detecting neutrons incident on the diode's neutron sensing surface coating.

GaAs Schottky barrier detectors having either a B-10 coating or the high density polyethylene coating of the present invention were mounted in light impenetrable Al boxes, in which the wall thickness of the Al boxes was only 1 mm. Aluminum has a very small total microscopic thermal neutron cross section, provides excellent radio frequency (RF) shielding, and eliminates photoelectric noise from room lights. The enclosed devices were placed into a collimated and doubly diffracted thermalized neutron beam provided by the Ford Nuclear Reactor (FNR), a materials test reactor at the University of Michigan. The devices were tested at reverse bias voltages ranging from 20 to 170 volts.

Referring to FIG. 5, there shown a graphic representation of the performance of prior boron coated GaAs Schottky barrier detectors in detecting thermal neutrons, with the detectors reverse biased by voltages of 100V (Curve I) and 160V (Curve II). FIG. 6 is a graphic illustration of the performance of GaAs barrier detectors with two different high density polyethylene coating thicknesses thereon for detecting high energy neutrons in accordance with the present invention. The upper curve in FIG. 6 is for a coating-thickness of 35 mils, while the intermediate curve is for a detector having a coating thickness of 5 mils. The bottom curve shows the detection performance for a bare detector. The detection peak at approximately channel 90 is the result of the recoil proton energy deposited in the active region of the detector. The low energy tail is due to detector noise and background from gamma rays, X-rays and scattered neutrons. In practice, the lower level discriminator would be set in the valley of the spectrum to maximize the neutron signal to noise ratio. The relative efficiency of the 35 mil coating is 2.7 times that of the 5 mil coating.

Figure 7:
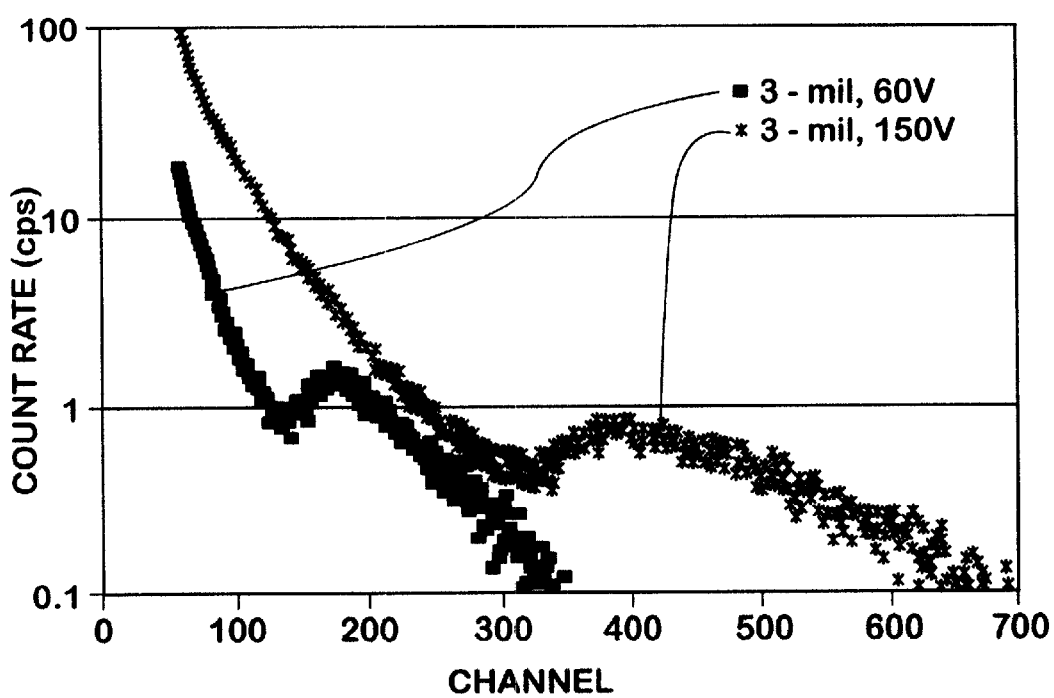
FIG. 7 is a graphic representation of the fast neutron response of a neutron detector in accordance with the present invention at two different detector bias voltages.

Referring to FIG. 7, there is shown in graphic form the fast neutron response of a neutron detector incorporating a GaAs semiconductor wafer in accordance with one embodiment of the present invention at two different detector bias voltages. The range of the recoil protons in the GaAs wafer exceeds the high field region of the detector. By increasing the bias voltage on the detector, the high field region is increased, resulting in higher energy deposition and a larger pulse from the detector. This can be observed in the figure which shows the results of increasing detector bias while maintaining all other parameters constant. Both curves are for a 3-mil thick GaAs wafer with the upper curve showing the count rate for a biasing voltage of 150V and the lower curve showing the count rate for a biasing voltage of 60V. The curves shown are amplified due to the increase in the depth of the active region of the detector. The effect of increasing detector bias is also shown in Table 1, where neutron count rate is the total count of all channels above the valley. The count rate is relatively constant (12% change) over the entire range of bias voltages, while the total count rate has increased by a factor of 15. The noise is amplified by the higher voltage and the gamma response is increased because of the increase in the size of the active region.

TABLE 1

Effect of Bias Voltage (3-mil poly coating)

| Bias Voltage (volts) | Total Rate (cps) | Neutron Rate (cps) | Valley Channel | Peak Channel |
| --- | --- | --- | --- | --- |
| 30 | 211.6 | 138.7 | 85 | 100 |
| 60 | 502.7 | 141.0 | 140 | 175 |
| 90 | 1211.4 | 147.2 | 195 | 255 |
| 120 | 2103.8 | 154.2 | 250 | 330 |
| 150 | 3182.0 | 157.8 | 320 | 380 |

Pure $^6$Li can be used as a neutron reactive coating in accordance with aspect of the present invention. The microscopic thermal neutron (0.0259 eV) absorption cross section for pure $^6$Li is 940 barns. The microscopic neutron absorption cross section also demonstrates a 1/v dependence. The neutron absorption cross section for $^6$Li remains lower than that of $^{10}$B for neutron energies bellow 100 keV. There is a salient resonance in the $^6$Li cross section appearing above 100 keV, in which the neutron absorption cross section for $^6$Li surpasses that of $^{10}$B for energies between approximately 150 keV to 300 keV. Pure $^6$Li has a mass density of 0.463 g/cm$^3$ and an atomic density of 4.634×10$^{22}$ atoms/cm$^3$. The macroscopic thermal neutron absorption cross section is 43.56/cm.

The $^6Li(n,\alpha)^3H$ reaction leads to the following products:

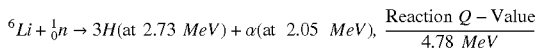

which are oppositely directed if the neutron energy is sufficiently small. Although the thermal neutron absorption cross section for $^6Li$ is lower than with $^{10}B$, the higher reaction product energies make it attractive for thermal neutron detection.

The low atomic density and the low mass density of pure $^6Li$ result in rather large reaction product ranges. With a lower level discriminator (LLD) setting of 300 keV, the values of L for the pure $^6Li$ film far surpass those calculated for the pure $^{10}B$ film, with $L_\alpha=19.05$ $\mu$m and $L_H=126.77$ $\mu$m. Also the resulting $\Sigma L$ products are much greater. At an LLD setting of 300 keV, the 2.73 MeV triton $\Sigma L$ product is 0.5532 and the 2.05 MeV $\alpha$-particle $\Sigma L$ product is 0.0823. Although large, these $\Sigma L$ values require rather thick reaction product films to achieve optimum performance.

One form of $^6Li$ is the stable compound of $^6LiF$ which may be used as the coating in accordance with another aspect of the present invention. The molecular density of $^6LiF$ is $6.118 \times 10^{22}$ molecules/cm$^3$, therefore the atomic density of $^6Li$ atoms within $^6LiF$ amounts to the same. The mass density of $^6LiF$ is 2.541 g/cm$^3$. With a microscopic thermal neutron cross section of 940 barns for $^6Li$, the resulting macroscopic thermal neutron cross section for $^6LiF$ is 57.51/cm.

An LLD setting of 300 keV gives $L_\alpha$ as 4.64 $\mu$m and $L_H$ as 29.25 $\mu$m. At 300 keV, the $\Sigma L$ product for 2.05 MeV $\alpha$ particles is 0.0267 and the $\Sigma L$ product for 2.73 MeV tritons is 0.1682. The $\Sigma L$ products for $^6LiF$ are very similar to than those of pure $^{10}B$, indicating that their maximum achievable thermal neutron efficiencies should also be similar.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for detecting neutrons comprising:

a semiconductor substrate having first and second opposed surfaces;

a layered metal arrangement disposed on the first surface of said semiconductor substrate and forming a rectifying junction;

a low resistivity contact layer disposed on the second opposed surface of said semiconductor substrate;

a voltage source connected between said layered metal arrangement and said low resistivity contact layer for reverse-biasing said rectifying junction; and a thin neutron responsive layer disposed on said low resistivity contact layer and responsive to energetic neutrons incident thereon for providing positive charged particles to said semiconductor substrate where said thin neutron layer is comprised of a hydrogen-rich polymer and where said polymer is an alkane hydrocarbon or an alkane hydrocarbon.

2. The apparatus of claim 1 wherein said polymer is a high density polyethylene.

3. The apparatus of claim 1 wherein incident neutrons have a maximum energy of 15 MeV and said neutron response layer is 2200 $\mu$m thick.

4. Apparatus for detecting neutrons comprising:

a semiconductor substrate having first and second opposed surfaces;

a layered metal arrangement disposed on the first surface of said semiconductor substrate and forming a rectifying junction;

a low resistivity contact layer disposed on the second opposed surface of said semiconductor substrate;

a voltage source connected between said layered metal arrangement and said low resistivity contact layer for reverse-biasing said rectifying junction; and a thin neutron responsive layer having a specified thickness and disposed on said low resistivity contact layer and responsive to energetic neutrons incident thereon for providing positive charged particles to said semiconductor substrate where said thin neutron layer is comprised of a hydrogen-rich polymer and where said polymer is an alkane hydrocarbon or an alkane hydrocarbon.

5. The apparatus of claim 4 wherein said specified thickness of said neutron responsive layer is selected to obtain a maximum intrinsic efficiency which is dependent on an incident energy associated with said incident neutrons.

6. The apparatus of claim 4 wherein said polymer is a high density polyethylene.

* * * * *